US008214402B2

(12) United States Patent
Bruno et al.

(10) Patent No.: US 8,214,402 B2
(45) Date of Patent: Jul. 3, 2012

(54) INTERACTIVE PHYSICAL DESIGN TUNING

(75) Inventors: Nicolas Bruno, Redmond, WA (US); Surajit Chaudhuri, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 412 days.

(21) Appl. No.: 12/484,564

(22) Filed: Jun. 15, 2009

(65) Prior Publication Data

US 2010/0318543 A1 Dec. 16, 2010

(51) Int. Cl.
*G06F 17/30* (2006.01)
(52) U.S. Cl. ........................................ 707/796; 707/802
(58) Field of Classification Search .................. 707/796, 707/802
See application file for complete search history.

(56) References Cited

U.S. PATENT DOCUMENTS

| 6,304,857 | B1 * | 10/2001 | Heindel et al. ................. 705/34 |
| 7,483,918 | B2 | 1/2009 | Chaudhuri et al. |
| 2006/0136358 | A1 * | 6/2006 | Sonkin et al. ...................... 707/1 |
| 2007/0239744 | A1 | 10/2007 | Bruno et al. |
| 2008/0183644 | A1 | 7/2008 | Bruno et al. |

OTHER PUBLICATIONS

Chaudhuri et al., "AutoAdmin "What-If" Index Analysis Utility", 1998, ACM, submitted as an IDS.*
Bruce Payette "Windows PowerShell in Action", 2007, Manning Publication Company, Greenwich, Connecticut.*
Konig, et al., "Scalable Exploration of Physical Database Design", Retrieved at <<http://research.microsoft.com/pubs/74050/ICDE06-final.pdf>>, Proceedings of the 22nd International Conference on Data Engineering, Apr. 3-7, 2006, pp. 1-11.
Tripp, Kimberly L.,"SQL Server 2005 Management Tools", Retrieved at <<http://www.google.com/url?sa=t&source=web&ct=res&cd=1&url=http%3A%2F%2Fdownload.microsoft.com%2Fdownload%2Fa%2Fc%2Fd%2Facd8e043-d69b-4f09-bc9e-4168b65aaa71%2FSQLMgmtTools.doc&ei=YfPtSdaFDZCCkQWMv62tDw&usg=AFQjCNHNXjIKVcVaqlpc2RBWXmnKHpwiLA>>, Mar. 2007, pp. 43.
Bruno, et al., "Online AutoAdmin (Physical Design Tuning)", Retrieved at <<https://research.microsoft.com/pubs/74157/sigmod016d.pdf>>, Proceedings of the 2007 ACM SIGMOD international conference on Management of data, Jun. 11-14, 2007, pp. 3.
"SQLCMD", Retrieved at <<http://www.sqlcmd.org/>>, Apr. 22, 2009, pp. 1-13.
"Exploratory Analysis using Database Engine Tuning Advisor", Retrieved at <<http://technet.microsoft.com/en-us/library/ms189291.aspx>>, Mar. 2009, pp. 1-3.
Agrawal, et al., "Database Tuning Advisor for Microsoft SQL Server 2005", Retrieved at <<http://www.vldb.org/conf/2004/IND4P3.PDF>>, Proceedings of the 30th Annual International Conference on Very Large Data Bases, Aug. 31-Sep. 3, 2004, pp. 1110-1121.
Agrawal, et al."Automated Selection of Materialized Views and Indexes in SQL Databases", Retrieved at <<http://www.cse.iitb.ac.in/dbms/Data/Courses/CS632/2007/Papers/index-view-sel-vldb2000.pdf>>, Proceedings of the 26th International Conference on Very Large Databases, Sep. 12-13, 2003, pp. 496-505.

(Continued)

*Primary Examiner* — Jean B Fleurantin
*Assistant Examiner* — Dennis Myint

(57) ABSTRACT

An architecture for providing interactive sessions for physical database design is described, allowing users to readily try different options, identify problems, and obtain physical designs in a flexible way. Embodiments based on a .NET assembly and modifications to a database management system (DBMS) are also described.

20 Claims, 13 Drawing Sheets

OTHER PUBLICATIONS

Agrawal, et al., "Automatic Physical Design Tuning: Workload as a Sequence", Retrieved at <<http://portal.acm.org/ft_gateway.cfm?id=1142549&type=pdf&coll=GUIDE&dl=GUIDE&CFID=32250230&CFTOKEN=60739395>>, Proceedings of the 2006 ACM SIGMOD international conference on Management of data, Jun. 27-29, 2006, pp. 683-694.

Agrawal, et al., "Integrating Vertical and Horizontal Partitioning into Automated Physical Database Design", Retrieved at <<http://portal.acm.org/ft_gateway.cfm?id=1007609&type=pdf&coll=GUIDE&dl=GUIDE&CFID=32250371&CFTOKEN=42657190>>, Proceedings of the 2004 ACM SIGMOD international conference on Management of data, Jun. 13-18, 2004, pp. 12.

Bruno, et al., "Automatic Physical Database Tuning: A Relaxation-based Approach", Retrieved at <<http://research.microsoft.com/pubs/74109/newdta.pdf>>, Proceedings of the 2005 ACM SIGMOD international conference on Management of data, Jun. 14-16, 2005, pp. 12.

Bruno, et al., "Physical Design Refinement: The "Merge-Reduce" Approach", Retrieved at <<http://research.microsoft.com/pubs/74110/viewmerging.pdf>>, ACM Transactions on Database Systems, vol. 32, No. 4, Nov. 2007, pp. 18.

Bruno, et al., "To Tune or Not to Tune? A Lightweight Physical Design Alerter", Retrieved at <<http://www.vldb.org/conf/2006/p499-bruno.pdf>>, 32nd International Conference on Very Large Data Bases, Sep. 12-15, 2006, pp. 499-510.

Bruno, et al., "An Online Approach to Physical Design Tuning", Retrieved at <<http://ieeexplore.ieee.org/stamp/stamp.jsp?tP=&arnumber=4221731&isnumber=4221635>>, IEEE 23rd International Conference on Data Engineering, Apr. 15-20, 2007, pp. 826-835.

Bruno, et al., "Constrained Physical Design Tuning", Retrieved at http://portal.acm.org/ft_gateway.cfm?id=1453863&type=pdf&coll=GUIDE&dl=GUIDE&CFID=32251027&CFTOKEN=96222965>>, Proceedings of the VLDB Endowment, vol. 1, No. 1, Aug. 23-28, 2008, pp. 4-15.

Bruno, et al., "Configuration-Parametric Query Optimization for Physical Database Tuning", Retrieved at <<http://www.cs.purdue.edu/homes/mehme/papers/sigmod08cpqo.pdf>>, Proceedings of the 2008 ACM SIGMOD international conference on Management of data, Jun. 9-12, 2008, pp. 12.

Chaudhuri, et al., "An Efficient Cost-Driven Index Selection Tool for Microsoft SQL Server", Retrieved at <<http://www.vldb.org/conf/1997/P146.PDF>>, Proceedings of the 23rd International Conference on Very Large Data Bases, Aug. 25-29, 1997, pp. 146-155.

Chaudhuri, et al., "Autoadmin 'What-if' Index Analysis Utility", Retrieved at <<http://portal.acm.org/ft_gateway.cfm?id=276337&type=pdf&coll=GUIDE&dl=GUIDE&CFID=32251454&CFTOKEN=98072980>>, Proceedings of the 1998 ACM SIGMOD international conference on Management of data, Jun. 1-4, 1998, pp. 367-378.

Chaudhuri, et al., "Index Merging", Retrieved at <<http://research.microsoft.com/pubs/76567/im.pdf>>, Proceedings of the 15th International Conference on Data Engineering, Mar. 23-26, 1999, pp. 8.

Dageville, et al., "Automatic SQL Tuning in Oracle 10g", Retrieved at <<http://www.vldb.org/conf/2004/IND4P2.PDF>>, Proceedings of the Thirtieth international conference on Very large data bases—vol. 30, Aug. 31-Sep. 3, 2004, pp. 1098-1109.

"Microsoft. Windows Powershell", Retrieved at <<http://www.microsoft.com/windowsserver2003/technologies/management/powershell/default.mspx>>, Apr. 22, 2009, pp. 1-4.

Papadomanolakis, et al., "An Integer Linear Programming Approach to Database Design", Retrieved at <<http://ieeexplore.ieee.org/stamp/stamp.jsp?arnumber=04401027>>, IEEE 23rd International Conference on Data Engineering Workshop, Apr. 17-20, 2007, pp. 442-449.

Valentin, et al., "DB2 Advisor: An Optimizer Smart enough to Recommend its Own Indexes", Retrieved at <<http://ieeexplore.ieee.org/stamp/stamp.jsp?tp=&arnumber=839397&isnumber=18144>>, Proceedings of the 16th International Conference on Data Engineering, 2000, pp. 10.

Zilio, et al., "DDB2 Design Advisor: Integrated Automatic Physical Database Design", Retrieved at <<http://www.vldb.org/conf/2004/IND4P1.PDF>>, Proceedings of the 30th Annual International Conference on Very Large Data Bases, Aug. 31-Sep. 3, 2004, pp. 1087-1097.

Zilio, et al., "Recommending Materialized Views and Indexes with IBM DB2 Design Advisor", Retrieved at <<http://www.cs.uwaterloo.ca/~kmsalem/courses/CS848F06/presentations/S05_1.pdf>>, Proceedings of the International Conference on Automatic Computing, CS848—Spring 2005, pp. 1-24

Agrawal et al., AutoAdmin: Self-Tuning Database Systems Technology, 2006, IEEE Bulletin, pp. 1-9.

Chaudhuri and Narasayya, Self-Tuning Database Systems: A Decade of Progress, VLDB Endowment 2007, ACM.

* cited by examiner

180

> # create a new Database object from namespace PDTCore
> # pointing to server nicolasb02 and database tpch01g 182 > $db = New-Object PDTCore.Database("nicolasb02", "tpch01g")

Connecting to server nicolasb02

Populating tables: LINEITEM CUSTOMER SUPPLIER NATION REGION

PARTSUPP PART ORDERS (8 read)

> # examine the Database object just created

184 > $db

Name : tpch01g

Connection : nicolasb02

Tables : LINEITEM, CUSTOMER, SUPPLIER, NATION...

Configurations : base, initial

Queries : {}

> # obtain information on tables larger than 500 pages
> # and sort the result by size 186 > $db.Tables.Values | ? { $ .Pages -gt 500 } | sort Pages | select Name, Pages, Columns

Name Pages Columns

---- ----- -------

PARTSUPP 1573 {PS PARTKEY, PS SUPPKEY...}

ORDERS 2288 {O ORDERKEY, O CUSTKEY...}

LINEITEM 11486 {L ORDERKEY, L PARTKEY...}

> # create a new query

188 > $q = [PDTCore.Query]::Create($db,

"SELECT * FROM LINEITEM WHERE L ORDERKEY=15")

> # evaluate the query under the base configuration

190 > $db.Configurations["base"].Eval($q)

Name Config Query Source Cost SelectInfos Update

---- ------ ----- ------ ---- ----------- ------ base Q1 base Q1 Server 0.0032831 1 False

```
<Databases>
    <Tables>
        <Columns/>
        <Indexes>
            <KeyColumns/>
            <SuffixColumns/>
        </Indexes>
    </Tables>
    <Queries>
        <Requests/>
        <QueryInfos/>
            <SelectInfos/>
        </QueryInfos/>
    </Queries>
    <Configurations>
        <Indexes/>
        <Transformations>
            <AddedIndexes/>
            <RemovedIndexes/>
        </Transformations>
        <QueryInfos/>
    </Configurations>
</Databases>
```

```
> # create a new provider on server nicolasb02
> # and default database tpch1g
> New-PDTDrive -Name P -Server nicolasb02 -Database tpch1g
> # go into the tables of tpch1g
> cd p:/tpch1g/tables
> # return all tables that start with part
> dir part* | sort Rows
Name Database Rows Pages Cols Indexes
---- -------- ---- ----- ---- -------
part tpch1g 200000 3618 9 2
partsupp tpch1g 800000 15628 5 2
> # get all indexes in the base configuration that have
> # more than two key columns
> dir P:/tpch01g/configurations/base/indexes |
? { $ .NumKeys -gt 1 }
Name Table Keys Includes
---- ----- ---- --------
PK LINEITEM 07F6335A LINEITEM 2 14
PK PARTSUPP 0519C6AF PARTSUPP 2 3
```

FIG. 5

> dir p:/tpch1g/tables | Out-Chart -gallery pie -label Name -values Pages    252
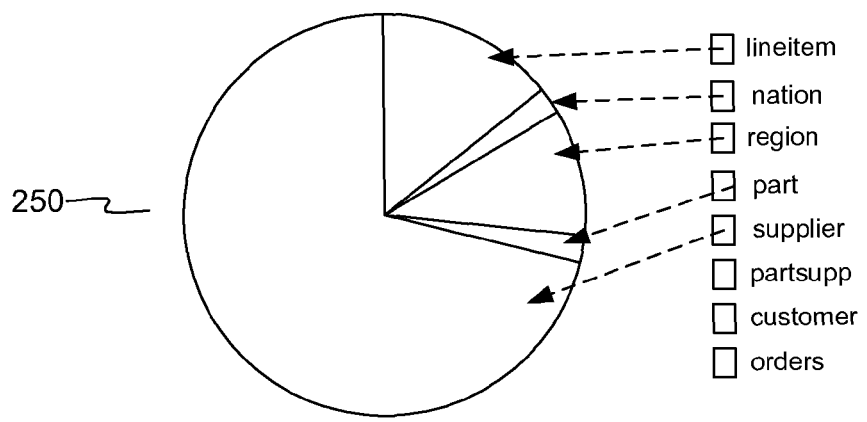
FIG. 6

```
> # load queries stored in a file. Note that results
> # can later be accessed via P:/tpch1g/queries
> Get-Query -Path D:/workloads/tpch-first-3.sql
Reading queries from D:/workloads/tpch-first-3.sql...
Name Database Type Rows Requests SQL
---- -------- ---- ---- -------- ---
Q0 tpch1g Select 5.74262 6 SELEC...
Q1 tpch1g Select 100 63 SELEC...
Q2 tpch1g Select 10 26 SELEC...
> # create two indexes and merge them
```
270 →
```
> $i1 = New-Index -Table lineitem -Keys l orderkey
> $i2 = New-Index -Table lineitem -Keys l partkey
-Includes l tax, l orderkey
> $i3 = $i1.merge($i2)
> $i3.keys
Name Table Width
---- ----- -----
l orderkey lineitem 4
l partkey lineitem 4
> # create a new configuration
> $c = New-Configuration -Indexes $i1, $i3
> # evaluate the three most expensive queries
> # under the new hypothetical configuration
```
272 →
```
> dir p:/tpch1g/queries | sort -desc Cost |
select -first 3 | Eval-Query -Configuration $c
Name Config Query Cost
---- ------ ----- ----
C2 Q2 C2 Q2 143.075
C2 Q1 C2 Q1 6.05483
C2 Q0 C2 Q0 120.384
```

```
function Refine-Configuration() {
        Param ([PDTCore.Query[]] $Workload,
                [PDTCore.Configuration] $Configuration,
                [double] $Size)
        $act = $Configuration
        while ($act.Size -gt $Size) {
                $tr = Get-Transformations $Workload -Config $act | sort Cost | select -first 1
                $act = $tr.Apply()
        }
return $act
}
```

FIG. 8

```
> # create a new provider
> New-PDTDrive -Name P -Server nicolasb02 -Database tpch1g
> # set the current location at the root of the provider
> cd P:
> # load TPC-H workload
> $w = Get-Query -Path D:/workloads/tpch-all.sql
Reading queries from D:/workloads/tpch-all.sql...
> # get the cost of all queries in the base configuration in decreasing order of cost
> $c = Get-Configuration base
> $w | Eval-Query -Configuration $c | sort -desc cost | out-chart -values Cost -label Name
```
310

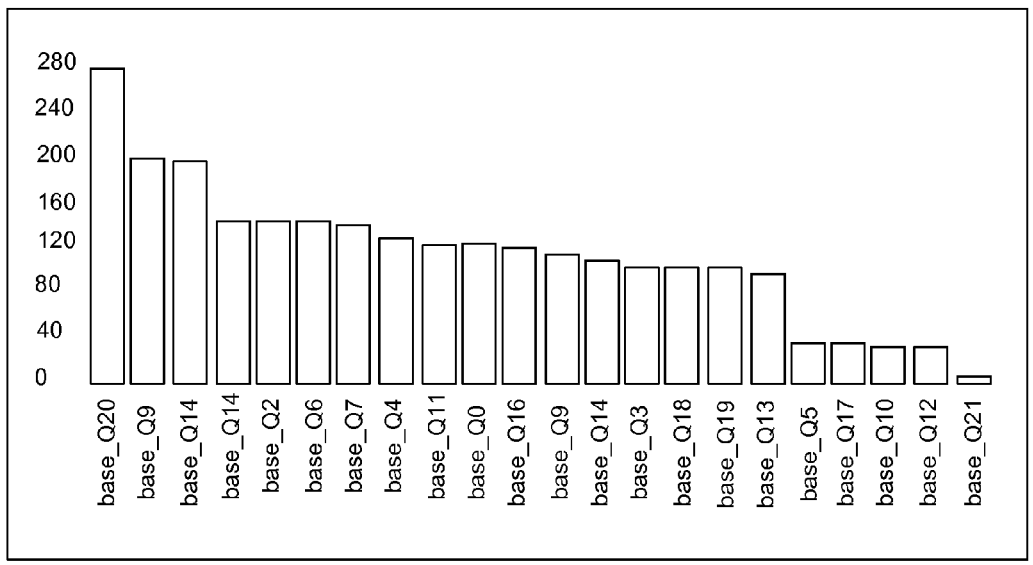

```
> # show the top-3 most expensive queries
> $expW = $w | Eval-Query -Configuration $c | sort cost -desc | select -first 3 | % {$ .query}
> $expW
Name Database Type Rows Requests
---- -------- ---- ---- --------
Q20 tpch1g Select 100 45
Q8 tpch1g Select 172.421 48
Q14 tpch1g Select 999.809 8
> # for each expensive query, obtain the access-path requests and infer the best indexes
> $bestIdx = $expW | % {$ .Requests} | % { $ .BestIndex }
> $bestIdx
Name Table Keys Includes
---- ----- ---- --------
PDT I17 orders 1 1
PDT I18 orders 1 1
PDT I19 lineitem 1 3
...
```

FIG. 9

```
> # create a new configuration with all these best indexes
> $bestC = New-Configuration -Indexes $bestIdx -Name "MyC"
> # compare this configuration with the base one for all queries in the workload
> Compare-Configurations -Workload $w -Config1 $bestC -Config2 (Get-Configuration base)
```

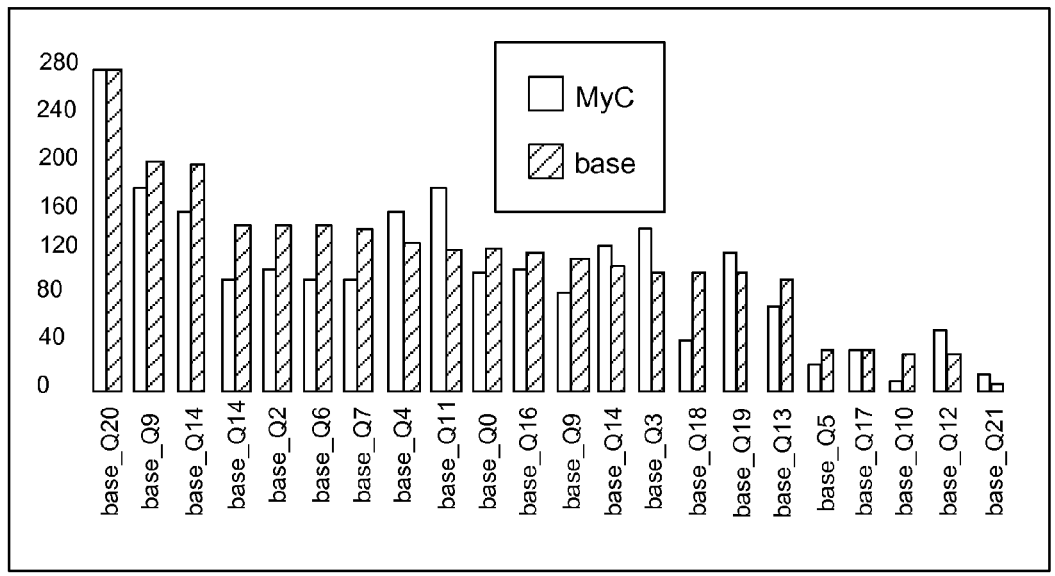

```
> # bestC surely is better, but what is its size compared to that of base?
> $bestC.size, (get-configuration base).size
3535.4453125
1234.5234375

> # bestC is 2.9 times larger than base, refine it down to 2.5GB
> $refC = Refine-Configuration -Configuration $bestC -Size 2500 -Workload $w -Timeout 20
> $refC
Name Database Size Cost Indexes
---- -------- ---- ---- -------
C11 tpch1g 2454.9765625 1080.27443 27
> # show all configurations evaluated by Refine-Configuration graphically
> dir P:/tpch1g/configurations | out-chart -values size -xvalues cost -gallery scatter
>
```

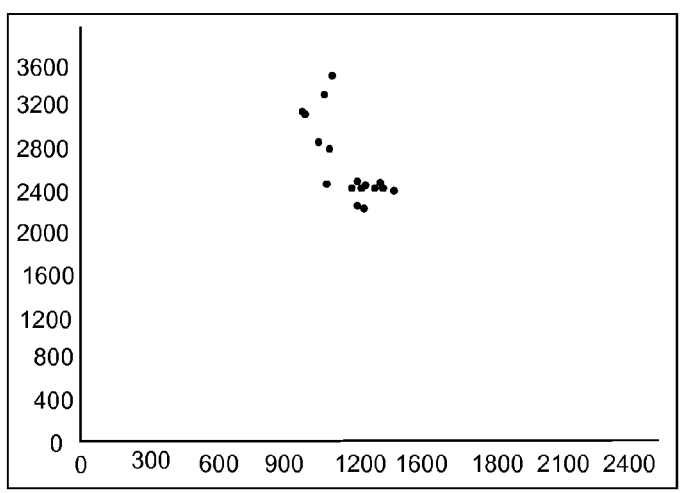

```
> # identified Q17 and Q20 as the only two that could be improved given more space
> # of these, Q17 is as bad as it gets (around 90 units)
> # Use Constraints to tune again so that no query is worse than 1.2x the cost under refC, but additionally
> # Q17 is expected to execute in fewer than 60 units. For that, try to get as close as possible to 2000MB
> $ct1 = "FOR Q in W ASSERT cost(Q,C) <= cost(Q,refC)*1.2"
> $ct2 = "ASSERT cost(W['Q17'], C) <= 60"
> $ct3 = "SOFT ASSERT size(C) = 2000"
> TuneConstrained-Workload -Workload $w -Timeout 600 -Constraints $ct1, $ct2, $ct3
> ...
```

FIG. 11

INTERACTIVE PHYSICAL DESIGN TUNING

BACKGROUND

Automated physical design tuning involves a database management system (DBMS) recommending a set of physical structures that increase the performance of an underlying database. Physical design has been formulated as a problem statement, traditionally: Given a workload W and a storage budget B, find the set of physical structures, or configuration, that fits in B and results in the lowest execution cost for W. Most modern commercial DBMS's have some facilities for automated design tuning. In general, however, it has not been possible to include in the tuning process information beyond the basic information of the design tuning problem statement.

For instance, it has not been possible to tune a given workload for maximum performance under a storage constraint while at the same time ensuring that no query degrades by more than 10% with respect to the original configuration. As another example, it has not been possible to enforce that the clustered index on a table T cannot be defined over certain columns of T that would introduce hot-spots (without specifying which of the remaining columns should be chosen). As yet another example, in order to decrease contention during query processing, there is no way to avoid any single column from a table from appearing in more than, say, three indexes (the more indexes a column appears in, the more contention arises due to exclusive locks during updates). While some new approaches allow more flexibility in the specification of a physical design tuning problem, existing solutions require that the whole specification to be provided upfront, without possibility of interaction.

Described herein are techniques for flexible and interactive physical design tuning.

SUMMARY

The following summary is included only to introduce some concepts discussed in the Detailed Description below. This summary is not comprehensive and is not intended to delineate the scope of the claimed subject matter, which is set forth by the claims presented at the end.

An architecture for providing interactive sessions for physical database design is described, allowing users to readily try different options, identify problems, and obtain physical designs in a flexible way. Embodiments based on a .NET assembly and modifications to a database management system (DBMS) are also described.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

FIG. 3 shows a transcript of an example interactive tuning session.

FIG. 4 shows an XML representation of a portion of a simplified version of a hierarchy exposed by a provider.

FIG. 5 shows a transcript of an example interactive tuning session using a provider.

FIG. 6 shows an example visualization.

FIG. 7 shows an example PowerShell session with two example cmdlets.

FIG. 8 shows an example script.

FIGS. 9-11 show a sample interactive physical database design tuning session.

DETAILED DESCRIPTION

Overview

Figure 1:
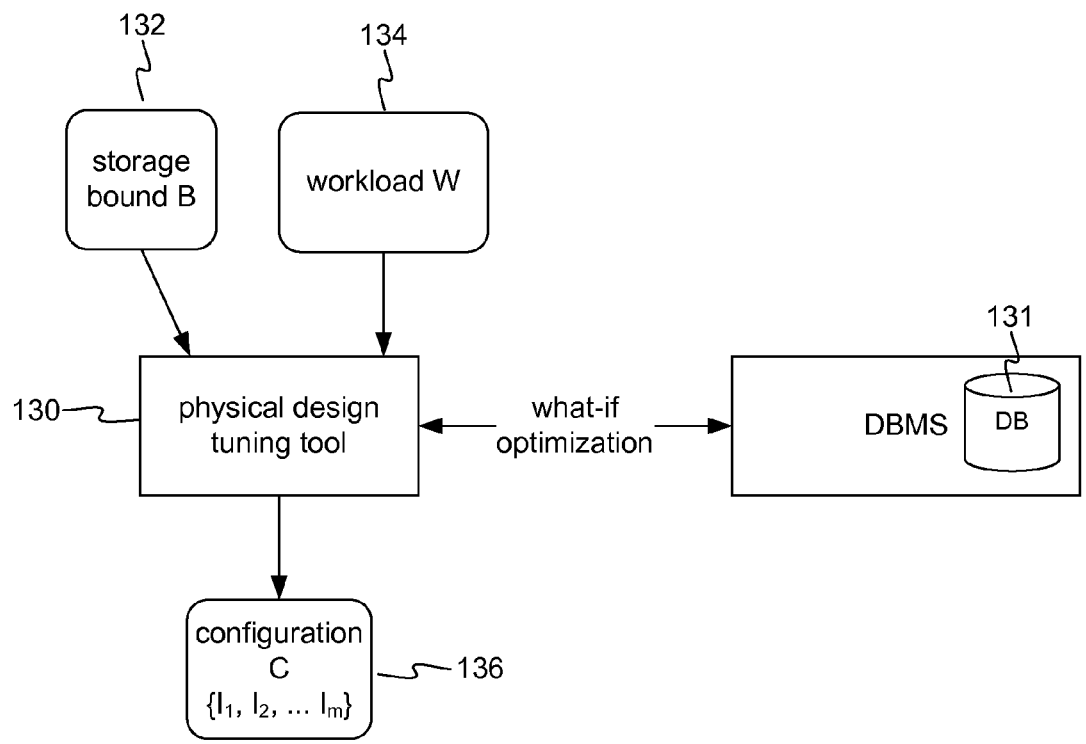
FIG. 1 shows a physical design tuning tool.

Embodiments discussed below relate to interactive physical design tuning of databases. For background, FIG. 1 shows a physical design tuning tool 130. The tuning tool 130 is an application used by a DBA to explore alternate configurations of a database 131 managed by a DBMS. Different storage boundaries 132 (e.g., memory limits) and physical configurations and workloads 134 (sets of queries) can be tested for performance results. The tuning tool 130 may function as a database client that communicates with the DBMS through an interface (an API provided by the database) to submit "what-if" scenarios that the DBMS explores, tests, and provides feedback on without necessarily executing the queries. In other words, the DBMS 102 can give feedback on how well a query optimizes or performs according to a possible configuration. As a result, the tuning tool 130 may output some configuration 136 (e.g., some set of indexes I1 . . . Im) deemed to be ideal for the given boundaries 132 and workload 134. Generally, the tuning tool 130 may test many configurations for a query before deciding which configuration is optimal. Regarding what-if facilities or instrumentation of a DBMS, description is provided elsewhere, for example, see "Self-Tuning Database Systems: A Decade of Progress", VLDB '07, ACM 978-1-59593-649-Mar. 7, 2009.

The scenarios mentioned in the Background above show that the state-of-the-art techniques for physical design tuning are inflexible. Referring to FIG. 1, the typical approach has been to specify a simple scenario, submit same to the DBMS, and receive a recommended configuration. Flexible and interactive refinement has not been possible. The inventors have observed that goals or constraints of tuning the physical design of a database system are often not fully specified upfront, but instead become apparent through experimentation, feedback, analysis, etc. Current physical design tools are monolithic, expose tuning options that are set at the beginning, and generate, without further user input, a final configuration to deploy into a production system.

Embodiments described below shift the design approach and allow tuning sessions to be highly interactive. Current monolithic architectures in physical design tools force users to specify the whole problem upfront and prevent users from making changes a posteriori or in general interacting with the system. Explanation will begin with description of an architecture for interactive sessions, followed by a review of Windows PowerShell as an infrastructure component that can support the architecture. Explanation will proceed with description of interactive tuning processes, followed by presentation of illustrative examples.

Layered Architecture for Physical Design Tuning

Figure 2:
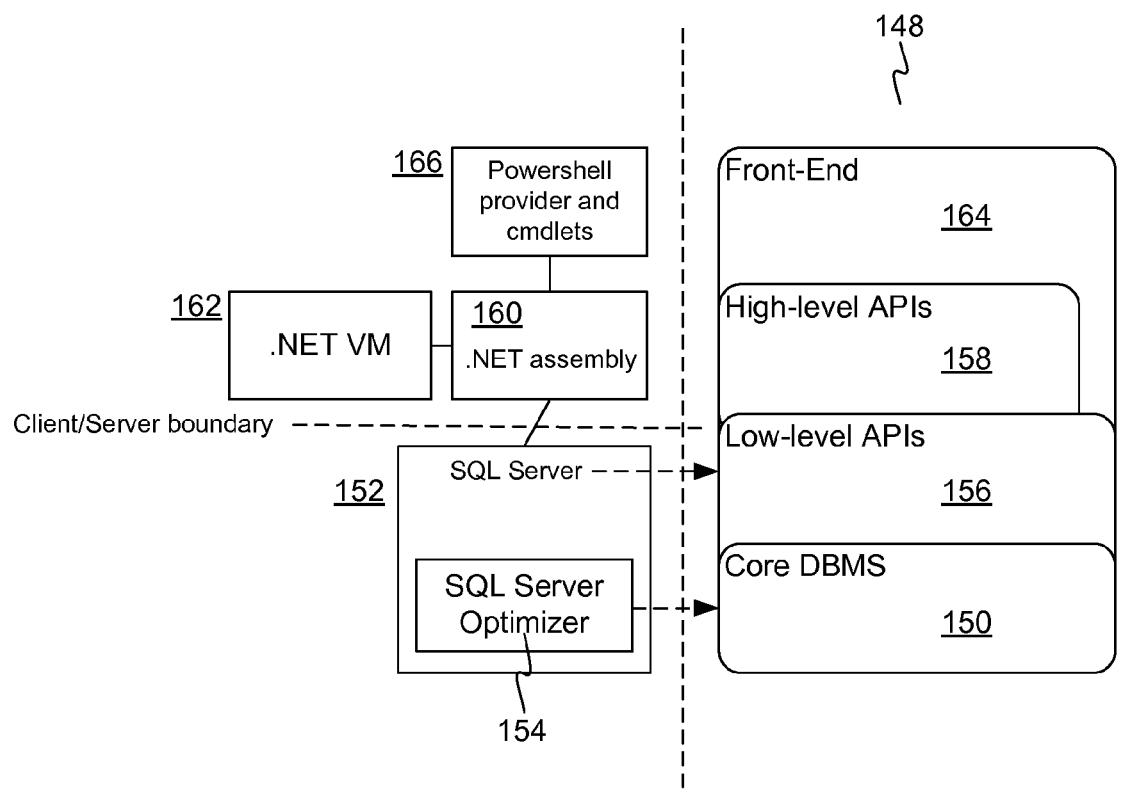
FIG. 2 shows a layered architecture for physical design tuning.

FIG. 2 shows a layered architecture 148 for physical design tuning. A Core DBMS layer 150 is a lowest layer within the DBMS (e.g., SQL Server 152) and provides native support for operations such as what-if optimization, which may be facilitated in party by a SQL Server Optimizer 154, for example. What-if optimization support in a DBMS is described in other sources, such as "Configuration-parametric query optimization for physical design tuning" (In Proceedings of the ACM International Conference on Management of Data (SIGMOD), 2008, and "Autoadmin 'What-if' index analysis utility" (In Proceedings of the ACM International Conference on Management of Data (SIGMOD), 1998). This layer provides what-if optimization (i.e., the ability to obtain expected costs of queries for varying physical designs without the requirement that the physical designs being implemented). Additionally, this layer enables rich information after regular optimization (see low layer API), such as sets of access path requests that can be later used to understand the set of possible indexes that could be useful for a given query. It does so by piggybacking on top of regular optimization and identifying access path requests. It may not actually expose functions, but instead may enable functionality that can be exposed in the low-level APIs.

A low-level API layer 156 may expose, in formats that are simple to consume (e.g., XML), the functionality of the Core DBMS layer 150 (and also the DBMS itself). As an example, they may expose primitives to manipulate a what-if mode of the DBMS and also may expose rich explain modes which, after optimizing queries, surface optimization information use at higher levels of the DBMS. The explain mode may provide useful information about the optimization of a query, such as the final plan obtained by the optimizer, cardinality estimates for intermediate results, access path requests, etc. (it may be thought of as an extension to existing modes in relational systems, such as showplans in Microsoft SQL Server). The low level API layer 156 may also encapsulate existing DBMS functionality, such as mechanisms that monitor and gather workloads.

A High-level API layer 158 if provided to facilitate access to the lower level APIs 156 and Core DBMS layer 150. Physical design tools were previously built on top of the low-level APIs only exposed a rigid functionality (e.g., point to a workload, set the storage constraint, and optimize). The high-level API layer 158 exposes the internal representations and mechanisms in a modular way. Basic concepts such as queries, indexes, databases, tables, and access-path requests are exposed as instantiable classes. In addition to these data structures, the high-level API layer 158 exposes composable and simple algorithms sometimes found in previous tuning tools. For instance, this layer may expose mechanisms to merge two indexes, or to obtain the best set of indexes for a single query. These primitive data structures and algorithms are not necessarily meant to be consumed by DBAs, but instead provide a foundational abstraction for applications to be built on top, as explained next. In one embodiment, described later, the high-level API layer 158 may be implemented as a .NET assembly 160, which is executed by a .NET VM 162 (Virtual Machine), sometimes called a managed code environment.

Front-ends 164 are based on both the low-level APIs 156 and high-level APIs 158 and deliver functionality to end users. One example of a front-end 164 is an interactive scripting platform to interact with physical database designs. The scripting language understands and works with the data structures and algorithms exposed by the underlying layers and allows users to write interactive scripts to tune the physical design of a database. Common tasks, such as minimizing the cost for a single storage constraint (or other functionality provided by previous physical design tools), can be implemented as pre-existing scripts that can be accessed using graphical user interfaces by relatively inexperienced DBAs.

As mentioned, a front-end 164 can be implemented by a scripting environment. For example, Windows Powershell 166 (tm), available from Microsoft Corporation is a scripting language that can be used as a front-end 164 in the architecture. A prototype implementation of the architecture using Windows Powershell 166 will also be described.

Windows Powershell

Windows PowerShell is an interactive, extensible scripting language that integrates with the Microsoft .NET Framework. It provides an environment to perform administrative tasks by execution of cmdlets (i.e., commandlets, which are basic operations), scripts (which are composition of cmdlets), stand-alone applications, or by directly instantiating regular .NET classes. The main features of Windows PowerShell include tight integration with .NET, strict naming conventions, object pipelines, and data providers.

Windows PowerShell integrates with the .NET framework and leverages the .NET framework to represent data. Windows PowerShell understands .NET classes natively, as illustrated below. Thus, new classes written in the .NET framework are easily available as first-class citizens in Windows PowerShell.

Windows PowerShell uses strict naming conventions. Cmdlets in Windows PowerShell follow a verb-noun naming convention, and parameters are passed in a unified manner. Some examples of such built-in cmdlets are Start-Service, which starts an OS (operating system) service in the current machine, Get-Process, which returns a list of processes currently executing, Clear-Host, which clears the screen, and Get-ChildItem which, if located in a file system directory, returns all its subdirectories or files. There are also aliases for the common cmdlets.

PowerShell also provides facilities to construct object pipelines. Similar to Unix shells, cmdlets can be pipelined using the "|" operator. However, unlike Unix shells, which typically pipeline strings, Windows PowerShell pipelines .NET objects. For instance, the script:

```
> Get-Process | Sort-Object -Property Handles -Desc |
  Select-Object -first 5 | Stop-Process
``` obtains the list of all running processes, pipes the result (which is a list of System.Diagnostics.Process .NET objects) to the Sort-Object cmdlet, which understands the semantics of the objects and sorts them by the property Handles in descending order. In turn, the result of this cmdlet (i.e., an ordered list of processes) is passed to the Select-Object cmdlet, which takes the first five processes and passes them to the next cmdlet in the pipeline, Stop-Process, which terminates them. The following script returns the number of lines that contains the word "constraint" in any LATEX file in the current directory that is below 100,000 bytes long:

```
> Get-ChildItem -Path *.tex | Where-Object -FilterScript { $ .Length -lt
100000 } | Foreach-Object -Process { Get-Content $ | Select-String
constraint } | Measure-Object Count : 404
``` which gets all files in the current path that have a "tex" extension and keeps only those that are smaller than 100,000 bytes. Then, each file is processed by first getting its content (which returns a list of string .NET classes), selecting only those that contain the work constraints. The combined result of this subscript is a list of strings, which is measured and the count is returned. To shorten a script, aliases (e.g., Get-ChildItem becomes "dir", Where-Object becomes "?", Foreach-Object becomes %), and positional cmdlet parameters can be used. For instance it is not necessary to explicitly write—Path after dir. An equivalent script is shown below:

```
> dir *.tex | ? { $ .Length -lt 100000 } | % { gc $ | Select-String
constraint } | measure Count : 404
```

PowerShell has the ability to expose hierarchical data models by means of data providers, which are then accessed and manipulated using a common set of cmdlets. As an example, the file system is one such provider. When situated in some node inside the file system provider, Get-ChildItem can be used to obtain the subdirectories or files in the current location, access contents of elements using Get-Content, and navigate the provider using Set-Location (aliased as cd). However, Windows PowerShell natively exposes the registry and the environment variables as providers. There also are third party providers that give a unified surface to access, query, and modify Active Directory, SharePoint and SQL Server, among others.

The next section describes how take advantage of the different features of Windows PowerShell to provide an interactive experience for physical design tuning.

Interactive Physical Design Tuning

A prototype implementation that enables interactive physical design tuning sessions will now be described. The architecture of this implementation is described first, followed by discussion of examples of how the implementation can be used. FIG. 2 shows how the different layers of architecture 148 map to the implementation. An implementation of each layer of the architecture 148 will be described in detail.

Low-Level APIs

The Core DBMS 150 and Low-level APIs 156 are implemented by instrumenting a database server, for instance Microsoft SQL Server 152. Some components (e.g., what-if optimization) are already part of this particular database server, while others (e.g., access-path request interception) were added.

High-Level APIs

The high-level API layer 158 is implemented by introducing a new .NET assembly 160 that encapsulates and exposes classes and algorithms relevant to physical design tuning. Among the classes that the assembly exposes are Database, Table, Index, Column, Query, Configuration, and Request classes. These are rich in functionality, so for instance the Index class may have methods that return merged and reduced indexes and methods that create hypothetical versions of the index in the database. The Query class may have methods that evaluate (optimize) it under a given configuration, and methods that return its set of access-path requests.

Additionally, as part of the .NET assembly 160, a sophisticated caching mechanism may be built to avoid optimizing the same query multiple times in the database server. Instead, each query remembers previous optimizations and, if asked again to optimize itself with a previously seen configuration, it returns the cached values without doing the expensive work again.

Because these classes are exposed in an assembly, the definitions thereof can be loaded directly into Windows PowerShell which may be used to explore, in interactive form, the physical design of a database, as illustrated in FIG. 3.

FIG. 3 shows a transcript 180 of an example interactive tuning session. First, a user created 182 a new database object; an object implemented by the .NET assembly but instantiated via user input typed at the PowerShell command prompt (">"). Then, the user explored the database object by typing its variable name 184, in response to which various information about the corresponding data is displayed (such information having been obtained from "nicolasb02" DBMS hosting the "tpch01g" database). Specific information about tables of the database is then displayed by invoking 186 appropriate properties of the $db database object. A new query object is then instantiated 188, and then the user evaluates the query 190 according to the "base" or default configuration of the database.

Front-End

While the example above is useful, call the .NET methods directly can be inefficient. Also, using such methods directly may be a time consuming way to accomplish tuning a database design. Using the capabilities of Windows PowerShell, functionally such as a provider, visualizations, cmdlets, and scripts can be used.

PowerShell providers are .NET programs that allow a user to work with data stores as though they were mounted drives or file systems, which simplifies accessing external data outside the PowerShell environment. A PowerShell provider can be implemented that exposes the information about a tuning session in a hierarchical and intuitive object model. FIG. 4 shows an XML representation 210 of a portion of a simplified version of a hierarchy exposed by a provider. By using this provider, the state of a tuning session can be easily manipulated and navigated as shown in FIG. 5. FIG. 5 shows a transcript 230 of an example interactive tuning session using a provider. Note that file system style commands such as "cd" and "dir" can be used to navigate and view database information, tuning information, configuration information, and so on.

FIG. 6 shows an example visualization 250. Use of a composable, interactive script language can allow inclusion of third-party add-ins that offer specific functionality. For example, the PowerGadgets web site provides simple cmdlets to display data graphically. One such cmdlet is Out-Chart, of which visualization 250 is an instance. The Out-Chart cmdlet displays a chart of the data that is pipelined in. The example visualization 250 graphically displays the relative sizes of all tables in a database by using the command 252.

In addition to a provider, the bare .NET classes and methods of the .NET assembly may be provided with composable cmdlets. FIG. 7 shows an example PowerShell session with two example cmdlets 270 and 272.

Scripts are another feature of the implementation. FIG. 8 shows an example script 290. The script is a simplified implementation of a common operation called refinement, in which a given input configuration is repeatedly "relaxed" via merging and reduction operations until it fits in the available storage, so that the expected cost of the resulting configuration is as low as possible. At each iteration, all possible transformations are calculated (using a cmdlet) and the one that is expected to result in the smaller execution cost is obtained. This process is repeated until a valid configuration is reached:

Other common algorithms may be similarly implemented, such as the relaxation based tuning approach in "Automatic physical database tuning: A relaxation-based approach" (N. Bruno and S. Chaudhuri., In Proceedings of the ACM International Conference on Management of Data (SIGMOD), 2005). One embodiment implements a version that handles constraint language, described in "Constrained physical design tuning" (N. Bruno and S. Chaudhuri, In Proceedings of the International Conference on Very Large Databases (VLDB), 2008). This script is called TuneConstrained-Workload and takes as inputs a workload, a timeout, and a set of constraints. Such a script may be implemented by using the .NET classes exported by the high-level APIs and may be implemented as a PowerShell script in fewer than 100 lines of code.

A Sample Interactive Tuning Session

FIGS. 9-11 show a sample interactive physical database design tuning session 310. Session 310 illustrates an interactive approach that provides flexibility and control during physical design tuning. The example uses the provider, cmdlets and scripts described earlier, as well as additional visualizations, among others. Advanced DBAs or other users may create their own scripts to further customize the physical design tuning experience. Moreover, native PowerShell features, such as remoting (which allows users to execute commands in other machines) or eventing and automation can surely complement tuning scripts and provide added flexibility. The comments in session 310 explain the actions taken by the user.

Figure 12:
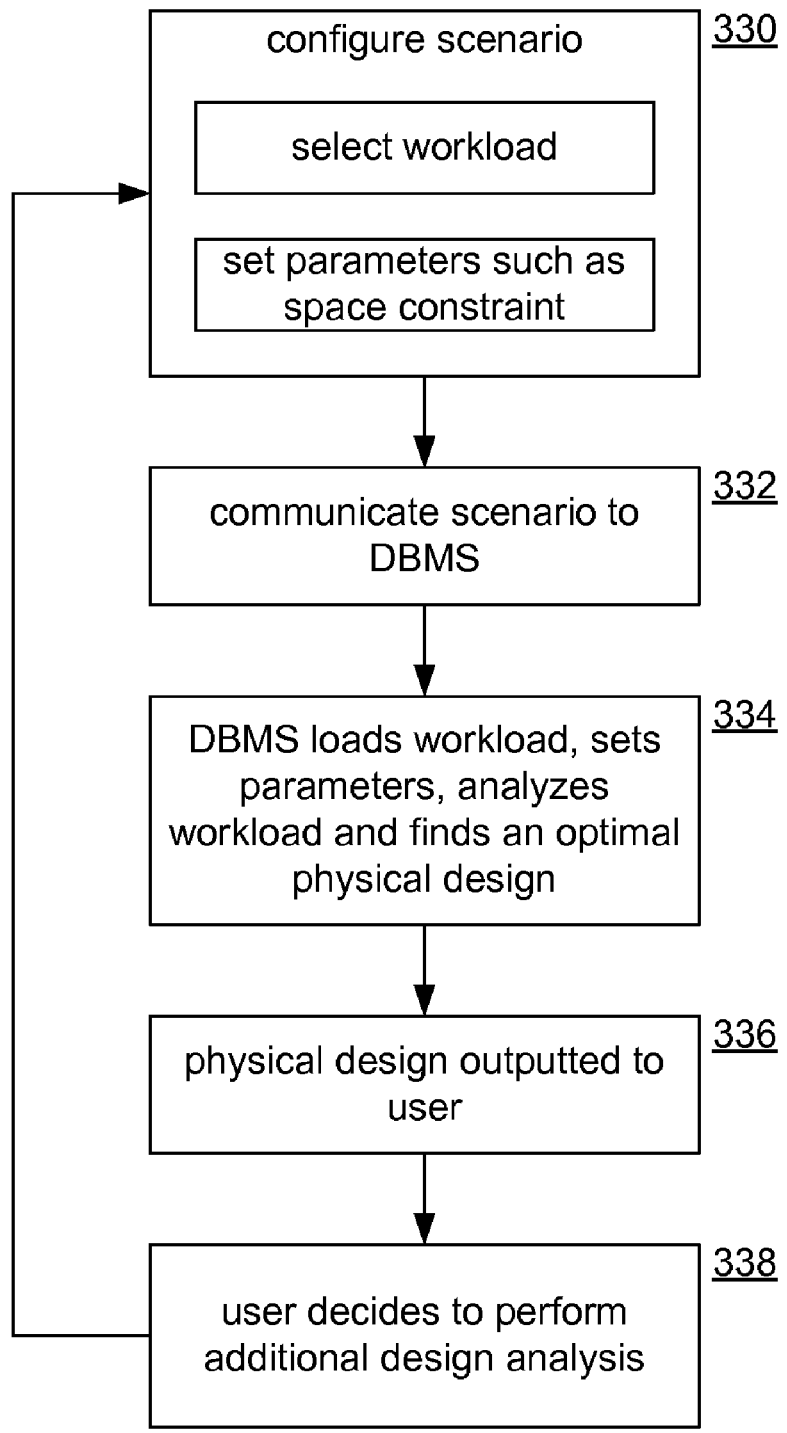
FIG. 12 shows a process of interactive design tuning.

FIG. 12 shows a process of interactive design tuning. The steps of FIG. 12 can occur in any arbitrary order; the order shown is for illustration only. Using an implementation of the architecture described above, a user may configure 330 a scenario by selecting workloads, setting parameters such as space constraint, and others. Eventually the user invokes a command (e.g., "Refine-Configuration") that communicates 332 the current scenario or configuration to a low-level API algorithm implemented by a DBMS. The DBMS may load 334 a workload, set parameters, and analyze the workload to find an optimal physical design, indicia of which (e.g., graphs, text) is outputted 336 to the user. The user may decide 338 to perform additional steps, again, in arbitrary order.

Figure 13:
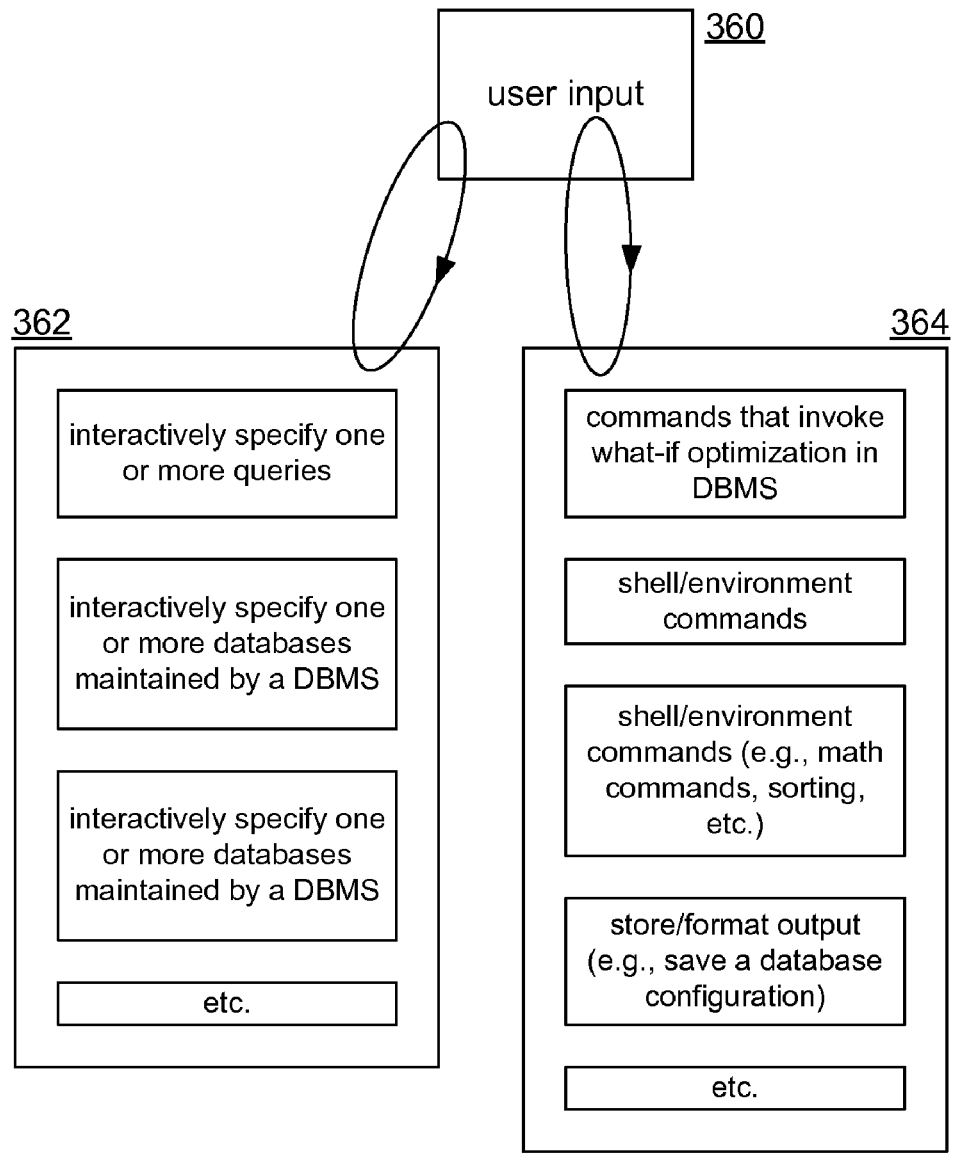
FIG. 13 shows a diagram illustrating user interaction possible for design tuning.

FIG. 13 shows a diagram illustrating the free-form manner of user interaction possible for design tuning. The user continuously enters user input 360, which may be specification commands 362 that specify the scenario such as a configuration, a workload or queries, databases, etc. Generally, specification commands are handled by the shell, front-end, high-level API (e.g., assembly), etc., rather than the DBMS. The user may also provide user input 360 in the form of commands 364 that invoke what-if functionality and other design functionality provided by the DBMS via the low-level API and/or core DBMS. While a command line shell/interpreter implementation has been described, graphical user interfaces can also be used, either as programs directly interfacing with the low-level API and high-level API, or by interfacing with another front-end such as a character-based shell environment.

CONCLUSION

Embodiments and features discussed above can be realized in the form of information stored in volatile or non-volatile computer or device readable media. This is deemed to include at least media such as optical storage (e.g., CD-ROM), magnetic media, flash ROM, or any current or future means of storing digital information. The stored information can be in the form of machine executable instructions (e.g., compiled executable binary code), source code, bytecode, or any other information that can be used to enable or configure computing devices to perform the various embodiments discussed above. This is also deemed to include at least volatile memory such as RAM and/or virtual memory storing information such as CPU instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on.

The invention claimed is:

1. A computer-implemented method to allow a user to interactively explore a physical database design, the method comprising:
    accessing a database management system (DBMS) including a database engine;
    storing and executing, in an execution environment separate from the DBMS, an object model comprised of objects that model a database configuration session, the objects including database objects that represent databases available via the DBMS, query objects that represent queries to the represented databases, and configuration objects specifying physical configurations of the represented databases;
    allowing a user to interactively input commands in arbitrary order, the commands operating on and referencing the objects in the object model, the commands including:
        specification commands specifying a database of the DBMS and instantiating a corresponding database object representing the specified database in the hierarchy of objects, wherein the database object can be invoked to obtain information from the DBMS about the specified database;
        specification commands specifying one or more queries associated with the database and instantiating corresponding query objects representing the one or more queries;
        specification commands specifying one or more physical configurations of the database and instantiating corresponding configuration objects associated with the database object, a specified physical configuration object identifying at least a set of indices of tables of the database;
        object commands that get and set values of the objects in the object model; and
        execution commands obtaining performance and/or optimization information from the DBMS according to the objects in the object model, the performance and/or optimization information generated by an API (application programming interface) of the DBMS that provides access to what-if functions of the DBMS that analyze query execution without fully executing queries, wherein the execution commands and object can be piped to and from each other and to and from text processing commands of the execution environment.

2. A computer-implemented method according to claim 1, wherein the commands are entered via a command line interpreter that receives the interactively inputted commands and which allows the user to create arbitrary variables and objects to be used as parameters of the commands.

3. A computer-implemented method according to claim 2, further comprising providing a module between the DBMS and the command line interpreter, wherein the command line interpreter communicates with objects of the module and the module communicates with an API of the DBMS.

4. A computer-implemented method according to claim 1, wherein the DBMS comprises a query optimizer and a low-level API communicating with the query optimizer, and the method further comprises executing an assembly in a managed code environment, the assembly communicating with the low level API, and receiving commands entered with a front-end program by a user.

5. A computer-implemented method according to claim 4, wherein in response to some of the commands the assembly creates or alters objects that are instances of classes implemented by the assembly without communicating with the DBMS.

6. A computer-implemented method according to claim 5, wherein in response to some of the commands the assembly communicates one or more properties of the objects of the assembly via the low-level API to the DBMS and in response receives the performance and/or optimization information from the DBMS.

7. A computer-implemented method according to claim 1, wherein the commands are entered via a program separate from the database, when an execution command is executed by the user, information entered by the specification commands is used to obtain the performance and/or optimization information from the DBMS, and when an execution command is executed the information entered by the specification commands continues to be maintained by the program and after a first execution command is executed and performance and/or optimization information is obtained by the program, a second execution command can be entered at any arbitrary time using the stored information of the first execution command.

8. A computer-implemented method according to claim 7, wherein the program comprises a shell environment with general programming features that allow the user to arbitrarily name variables and assign values to the variables.

9. One or more computer-readable storage media storing information to enable a computing device to perform a process, the process comprising:
establishing a connection between a shell and a DBMS, the shell comprising an interactive command line environment in which variables can be formed and assigned and shell commands can be piped to other shell commands, the shell configured to enable a user to interact with a tuning API of the DBMS, the tuning API receiving hypothetical scenarios inputted via the shell and submitting them to the DBMS and returning corresponding physical database design configurations generated by the DBMS, the physical database design configurations comprising configurations of a database managed by the DBMS, wherein the shell is configured to allow the user to interactively build and modify hypothetical scenarios and at any arbitrary time while interactively building and modifying hypothetical scenarios the shell allows the user to submit one of the hypothetical scenarios to the DBMS via the tuning API, wherein the shell maintains the hypothetical scenarios between submissions of the hypothetical scenarios via the tuning API, and wherein the hypothetical scenarios comprise queries and physical constraints maintained in an object model manipulated by commands inputted by the user via the shell, the shell, in response to user input, passing a query and physical constraint from the object model through the tuning API to the DBMS, the shell in return receiving and outputting a physical design computed by the DBMS.

10. One or more computer-readable storage media according to claim 9, wherein the shell comprises an intermediary between an application program and the DBMS, and the user builds and modifies the hypothetical scenarios by interacting with the application program.

11. One or more computer-readable storage media according to claim 9, wherein the shell comprises an application program that includes an implementation of a scripting language, the user interacting with the application program to formulate commands in the scripting language.

12. One or more computer-readable storage media according to claim 11, wherein the shell exposes objects of the object model that represent structures of the database and exposes physical design tuning functions, the commands in the scripting language referencing the objects and the design tuning functions exposed by the shell.

13. One or more computer-readable storage media according to claim 9 wherein the shell comprises a programming environment in which the user can create and manipulate arbitrary variables that are used to define the arbitrary scenarios.

14. One or more computer-readable storage media according to claim 13, wherein the exposed objects include objects representing databases, tables, configurations comprised of at least indices, and queries.

15. One or more computer-readable storage media according to claim 9, wherein the physical database design configurations are generated by optimization analysis performed by the DBMS.

16. One or more computer-readable storage media storing information configured to enable a computing device to perform a process, the process performed by a shell in communication with a database management system (DBMS), the process comprising:
providing commands invoked by a user using the shell to instantiate objects and designate variables pointing to the objects of an object model, the objects including at least a database object, a query object related to the database object, and a configuration object related to the database object, the configuration object comprising information indicating a set of indexes specified by the user;
providing what-if commands executable by the user using the shell to invoke what-if analysis of the DBMS by passing information from the objects to the DBMS, the what-if commands obtaining performance and/or optimization information from the DBMS according to the objects in the object model, the performance and/or optimization information generated by an API (application programming interface) of the DBMS that provides access to what-if functions of the DBMS that analyze query execution of queries specified in the object model without fully executing the queries; and
providing execution of the shell, wherein the shell receives interactive command-line input from the user and provides corresponding output to a display device, wherein the interactive input allows the user to invoke the what-if commands with reference to the objects.

17. One or more computer-readable storage media according to claim 16, further comprising: providing math commands for arbitrary math computations and text commands for arbitrary text computations, and wherein the shell allows the user to construct arbitrary compound commands by interactively specifying, for a compound command, a what-if command, a math or text command, where the compound command references or provides output to one of the variables, and where output of one of the compound command's commands is provided as input to another of the compound command's commands.

18. One or more computer-readable storage media according to claim 16, wherein the shell comprises an assembly executed by a managed code environment, the shell interfacing with one or more APIs of the DBMS and implementing classes representing database structures of which the objects instantiated by the user are instances.

19. One or more computer-readable storage media according to claim 16, wherein the user invokes a command to specify a workload, and the user repeatedly invokes commands to refine a hypothetical configuration of the database and repeatedly invokes the what-if commands between refinements of the hypothetical configuration of the database.

20. One or more computer-readable storage media according to claim 16, further comprising providing a visualization command that is invoked as part of a compound command where the visualization command receives output of one of the what-if commands and generates corresponding graphical representation of the output.

* * * * *